No. 783,094. PATENTED FEB. 21, 1905.
H. D. BLAKESLEE.
HORSESHOER'S LEVELING GAGE.
APPLICATION FILED AUG. 5, 1904.

Witnesses
Emma A. Strauss
O. P. Knight

Inventor
Henry D. Blakeslee
by Townsend Bros.
attys.

No. 783,094. Patented February 21, 1905.

UNITED STATES PATENT OFFICE.

HENRY D. BLAKESLEE, OF UPLAND, CALIFORNIA.

HORSESHOER'S LEVELING-GAGE.

SPECIFICATION forming part of Letters Patent No. 783,094, dated February 21, 1905.

Application filed August 5, 1904. Serial No. 219,613.

*To all whom it may concern:*

Be it known that I, HENRY D. BLAKESLEE, a citizen of the United States, residing at Upland, in the county of San Bernardino and State of California, have invented a new and useful Horseshoer's Leveling-Gage, of which the following is a specification.

The main object of this invention is to provide means for enabling a blacksmith to trim a horse's hoof in such manner that the shoes will set square and level or laterally balanced thereon.

In a large proportion of cases lameness in horses results from their shoes not being properly balanced or not setting squarely on the hoof with reference to the axis of the foot or leg, thereby causing a lateral or bending strain on the foot each time the shoe strikes the ground. At present the blacksmith attempts to control this simply by the eye, paring and filing the hoof until he thinks it is sufficiently cut away and about even on both sides. There is always a tendency, however, to cut away more on one side than on the other, particularly in filing, so that results are often unsatisfactory and, as stated, lead to many cases of lameness.

My invention removes any such difficulty by providing the blacksmith with a leveling-gage by the use of which he is enabled to bring the lower surface of the hoof into substantially balanced or square relation with regard to the axis of the leg.

The accompanying drawings illustrate the invention.

Figure 1:
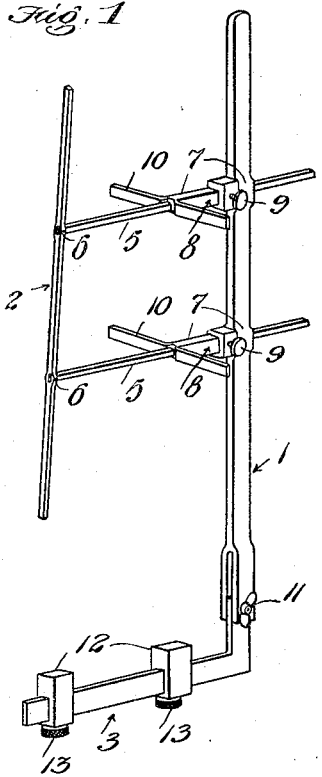
Figure 2:
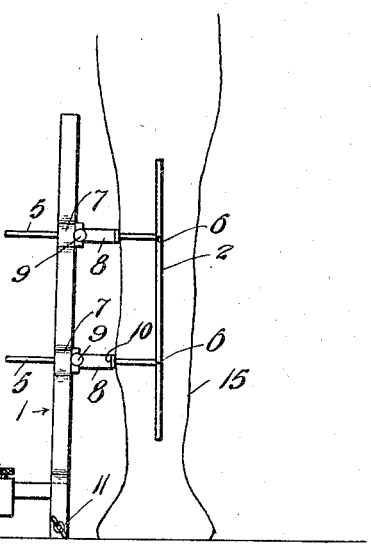
Figure 3:
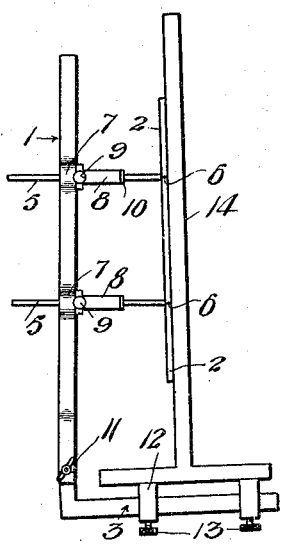
Figure 4:
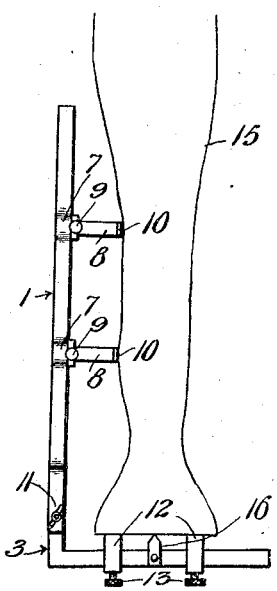

Figure 1 is a perspective view of the gage. Fig. 2 shows the application thereof to a horse's leg in setting the gage. Fig. 3 shows a further operation in the final setting of the gage by means of a try-square. Fig. 4 shows the application of the adjusted or set gage to the horse's leg and hoof for truing up the latter.

The gage comprises a bar or support member 1, a gage member 2, adjustably and detachably mounted on said bar, and a hoof-engaging member 3, also adjustable on said bar. The gage member 2, which may be a straight bar, is adjustable both as regards its lateral extension thereof and its angular position relative thereto. For this purpose two arms or bars 5 may be pivoted to said member 2 at 6 and are adapted to slide longitudinally in sockets 7, formed in the bar 1, and in brackets 8, extending therefrom, set-screws 9 being provided in each bracket 8 to clamp the bars 5 in said sockets when they have been brought to proper position. Member 2 may be detached from the body 1 by loosening the clamps and sliding the bars 5 from the brackets 8. The bar 1 is further provided with abutment means or stops 10, which may project laterally from each side of each bracket 8 in position to engage with the leg of the horse, as hereinafter described. The support for the gage member 2, above described, is such as to permit of independent lateral and angular adjustment of the member 2 relatively to the body 1—that is to say, the angular adjustment is independent of the lateral adjustment, and vice versa, this being essential for the purpose of this invention. The hoof-engaging member 3 is pivoted to the bar 1, being provided at the pivotal point with a clamping-screw 11 to adjust its angular position relative to the body 1. The gage member 3 may have two gage-blocks 12 slidable thereon and capable of being fastened in any desired position on the member 3 by means of set-screws 13 and may have a third gage-block 16 (see Fig. 4) to define the center of the foot.

In using the device a try-square or T-square of some kind will be required, as hereinafter described, such a try-square being indicated at 14 in Fig. 3.

The device is used as follows: The set-screws 9 and 13 are loosened to allow free adjustment of the parts, and the device is applied to the leg of a horse, as shown in Fig. 2, with the stops or abutments 10 resting against the side of the leg. (Indicated at 15.) The member 2 is now adjusted or moved to bring it parallel to the central line of the leg and in a plane extending forwardly and rearwardly through the axis of the leg. The set-screws 9 are then tightened to clamp the member 2 in set position on the body 1, and the device is removed from the horse's leg and the T-square 14 applied thereto, as shown in Fig. 3, with the blade of the square resting against the member 2. The head of the T-square will then be at right angles to said member 2, and by turning up the member 3 until its gage-blocks 12 rest evenly on said T-square, at the same time sliding said T-square up or down, if necessary, the member 3 or the line of contact of the gage-blocks thereon may be brought likewise at right angles to said member 2. The set-screw 11 is then tightened to hold the member 3 in this position, and the set-screws 9 are loosened and the member 2 removed from the body 1. On now applying the device again to the horse's leg, with the stops 10 resting against substantially the same parts as before, it will be seen that the line joining the outer ends of the gage-blocks 12 will be at right angles to the axis of the horse's leg, and the blacksmith in trimming and filing the hoof can bring the lower surface thereof into accurate lateral balance or squareness with the horse's leg by noting whether the gage-blocks 12 fit evenly on the two sides of the hoof. The gage-blocks 12 may be adjusted to greater or less distance apart, according to the size of the hoof that is being operated upon.

What I claim is—

1. A gage device for the purpose set forth comprising a body with stop portions, a gage member, means detachably connecting said gage member to said body enabling independent lateral and angular adjustment of said gage member relative to said body, a second gage member pivoted on said body and angularly adjustable thereon, and means for holding said second gage member in adjusted position.

2. A gage device for the purpose set forth comprising a bar having brackets with stop portions projecting therefrom, a gage member having arms pivoted thereto and sliding in said brackets, means for clamping the said arms in position in the brackets, and a second gage member pivoted on and angularly adjustable with reference to said body.

3. A horseshoer's gage comprising a supporting-body provided with stop portions adapted to engage the leg of a horse, a gage member detachably supported on said body and laterally and angularly adjustable thereon to enable it to be set parallel with the axis of the horse's leg and a second gage member pivoted to said body and adjustable to enable it to be set in definite relation to the first-named gage member.

4. A horseshoer's gage comprising a supporting-body member, a gage member having pivoted arms slidable in said body member, means for clamping said arms to said body member, and a hoof-engaging member pivoted to said body member.

5. A horseshoer's gage comprising a supporting-body provided with stop portions adapted to engage the leg of a horse, a gage member detachably supported on said body and laterally and angularly adjustable thereon to enable it to be set parallel with the axis of the horse's leg, and a second gage member pivoted to said body and adjustable to enable it to be set in definite relation to the first-named gage member and provided with gage-blocks adjustably mounted thereon.

6. A horseshoer's gage comprising a supporting-body provided with stop portions adapted to engage the leg of a horse, a gage member detachably supported on said body and laterally and angularly adjustable thereon to enable it to be set parallel with the axis of the horse's leg, and a second gage member pivoted to said body and adjustable to enable it to be set in definite relation to the first-named gage member and provided with gage-blocks adjustably mounted thereon comprising two side gage-blocks and a center gage-block.

7. A gage device for the purpose set forth comprising a body with stop portions, a gage member, means detachably connecting said gage member to said body enabling independent lateral and angular adjustment of said gage member relative to said body, and a second gage member pivoted on said body and angularly adjustable thereon.

In testimony whereof I have hereunto set my hand, at Upland, California, this 28th day of July, 1904.

HENRY D. BLAKESLEE.

In presence of—
  JAS. L. PAUL,
  M. F. PALMER.